United States Patent [19]

Tsujimura et al.

[11] 4,223,351
[45] Sep. 16, 1980

[54] DIGITALLY CONTROLLED VIDEO DISSOLVE CIRCUIT

[75] Inventors: Katsuhito Tsujimura, Machida, Japan; Louis Moutet; Jean-Marc Moenne-Loccoz, both of Paris, France

[73] Assignees: Sony Corporation, Tokyo, Japan; Thomson-CSF, Paris, France

[21] Appl. No.: 908,770

[22] Filed: May 23, 1978

[30] Foreign Application Priority Data

May 24, 1977 [JP] Japan .................................. 52-59305

[51] Int. Cl.² ............................................. H04N 5/22
[52] U.S. Cl. .................................................. 358/182
[58] Field of Search ......................... 358/182, 22, 183

[56] References Cited

U.S. PATENT DOCUMENTS

| 3,598,908 | 8/1971 | Poulett | 358/182 |
| 3,941,925 | 3/1976 | Busch et al. | 358/183 |
| 4,134,129 | 1/1979 | Filipovich | 358/55 |

FOREIGN PATENT DOCUMENTS 799767 8/1958 United Kingdom ............... 358/139

*Primary Examiner*—John C. Martin
*Attorney, Agent, or Firm*—Lewis H. Eslinger; Alvin Sinderbrand; Roland Plottel

[57] ABSTRACT

A video signal processing circuit for producing a dissolve control signal to control dissolving of a video signal uses primarily digital circuitry to derive the dissolve signal. A phase locked loop is used to produce a clock signal having a frequency which is a multiple of the vertical synchronizing signal in the video signal, and which is frequency divided by a fraction determined by a programmable counter which defines the rate of dissolve. The divided signal is processed by a signal processor and delivered to an up/down counter controlling a digital to analogue converter, the output of which is processed to produce as said control signal a ramp signal of which the slope is determined by the programmable counter. To provide a dissolving operation of long duration the counter is temporarily halted at midcount. Also, the perceived duration of the dissolve operation is made equal to the actual duration by altering the shape of the dissolve control signal.

14 Claims, 32 Drawing Figures

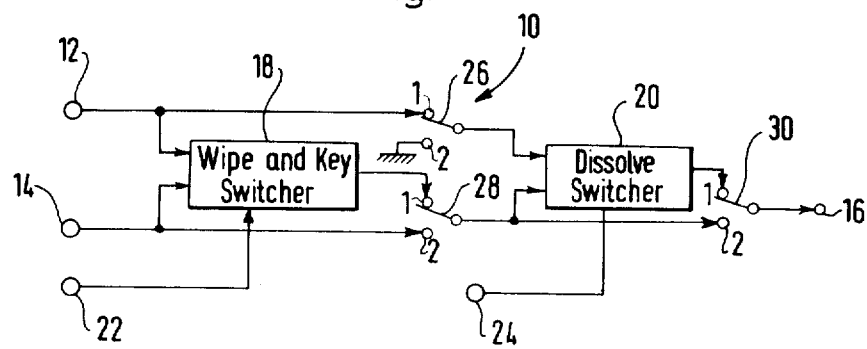
Fig. 1
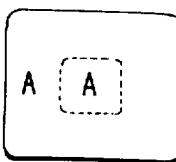 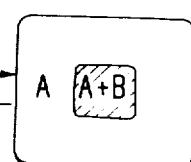 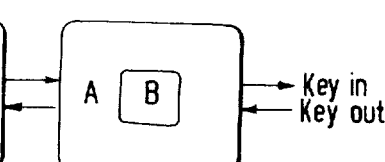
Fig. 2A
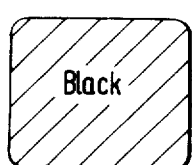 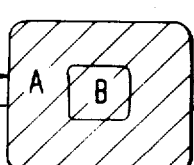 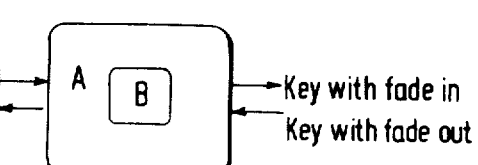
Fig. 2B

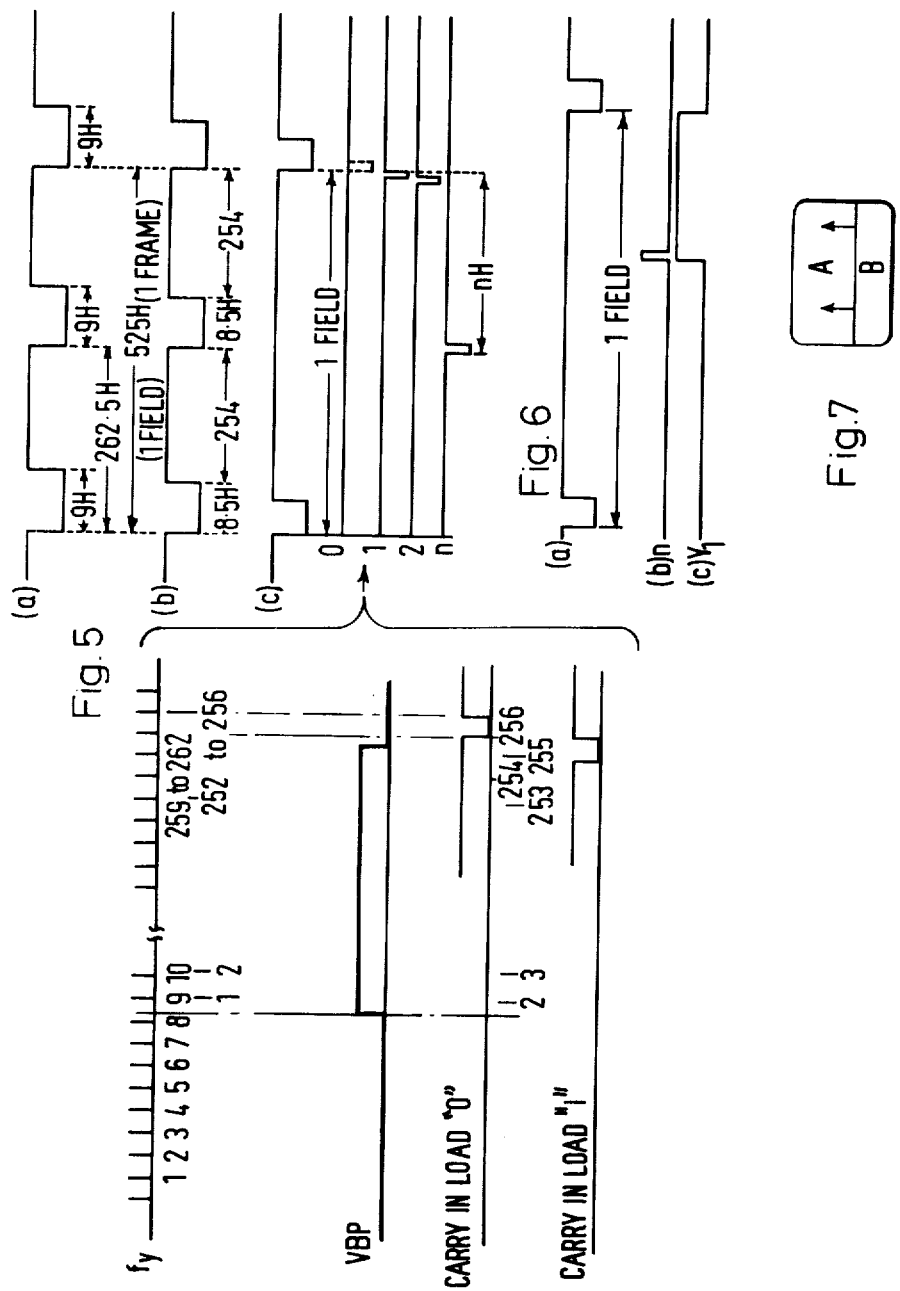

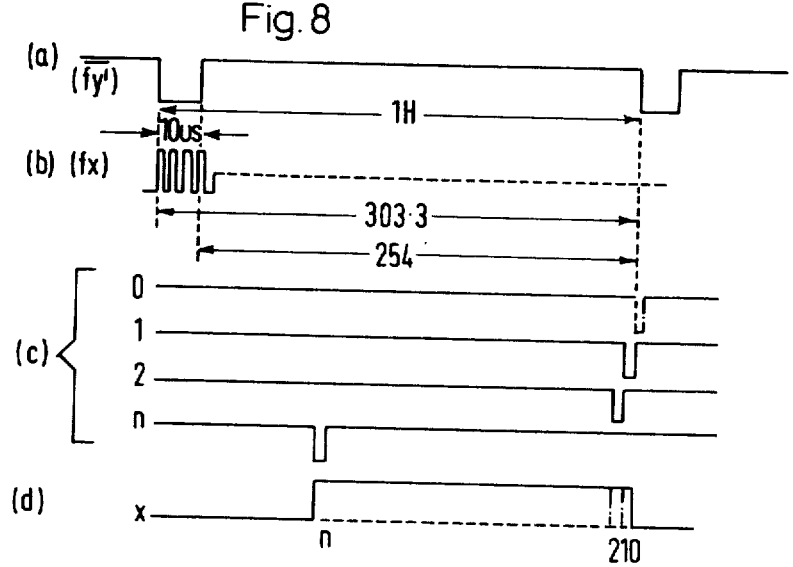
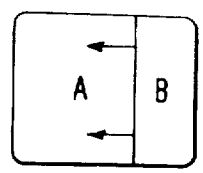
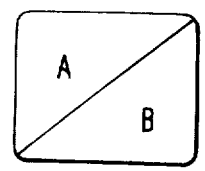
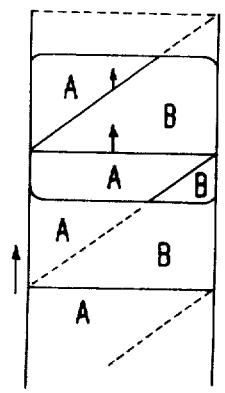
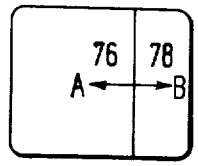

Fig. 13
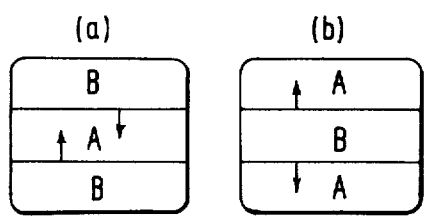
Fig. 14
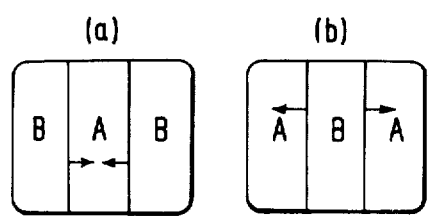
Fig. 15
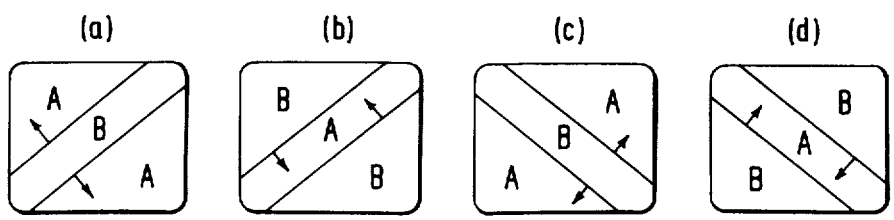
Fig. 15¹
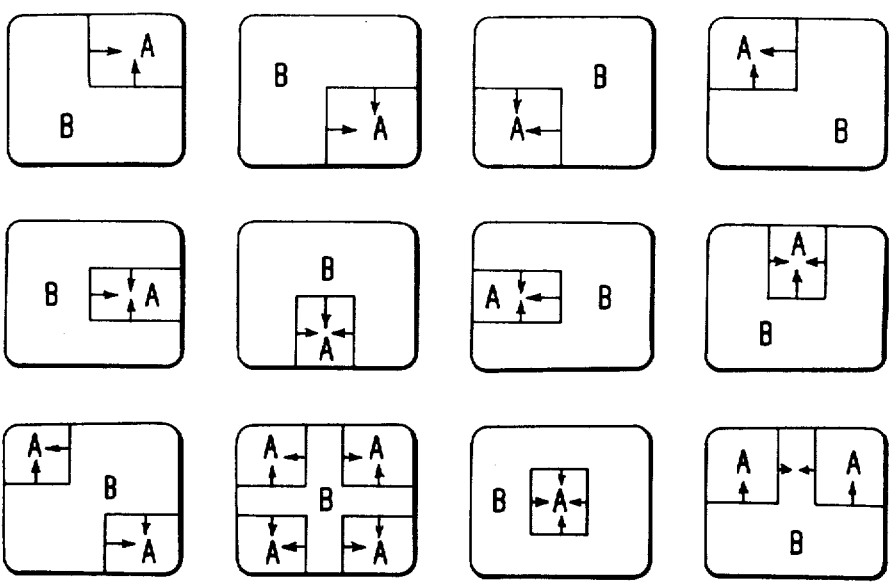

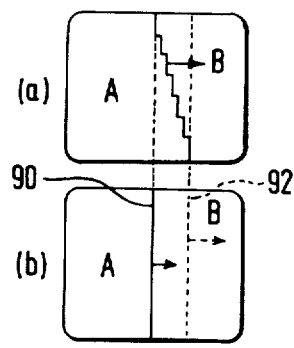
Fig. 16
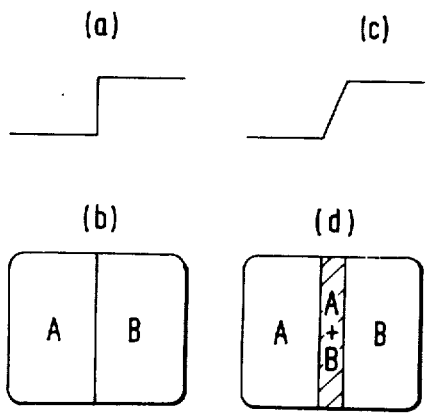
Fig. 17
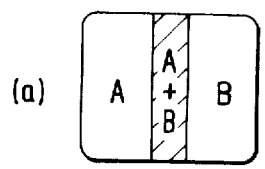
Fig. 18
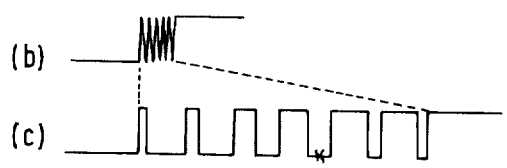
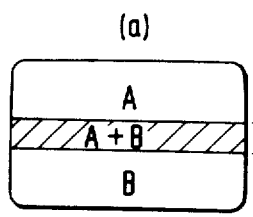
Fig. 19
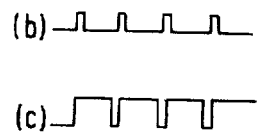

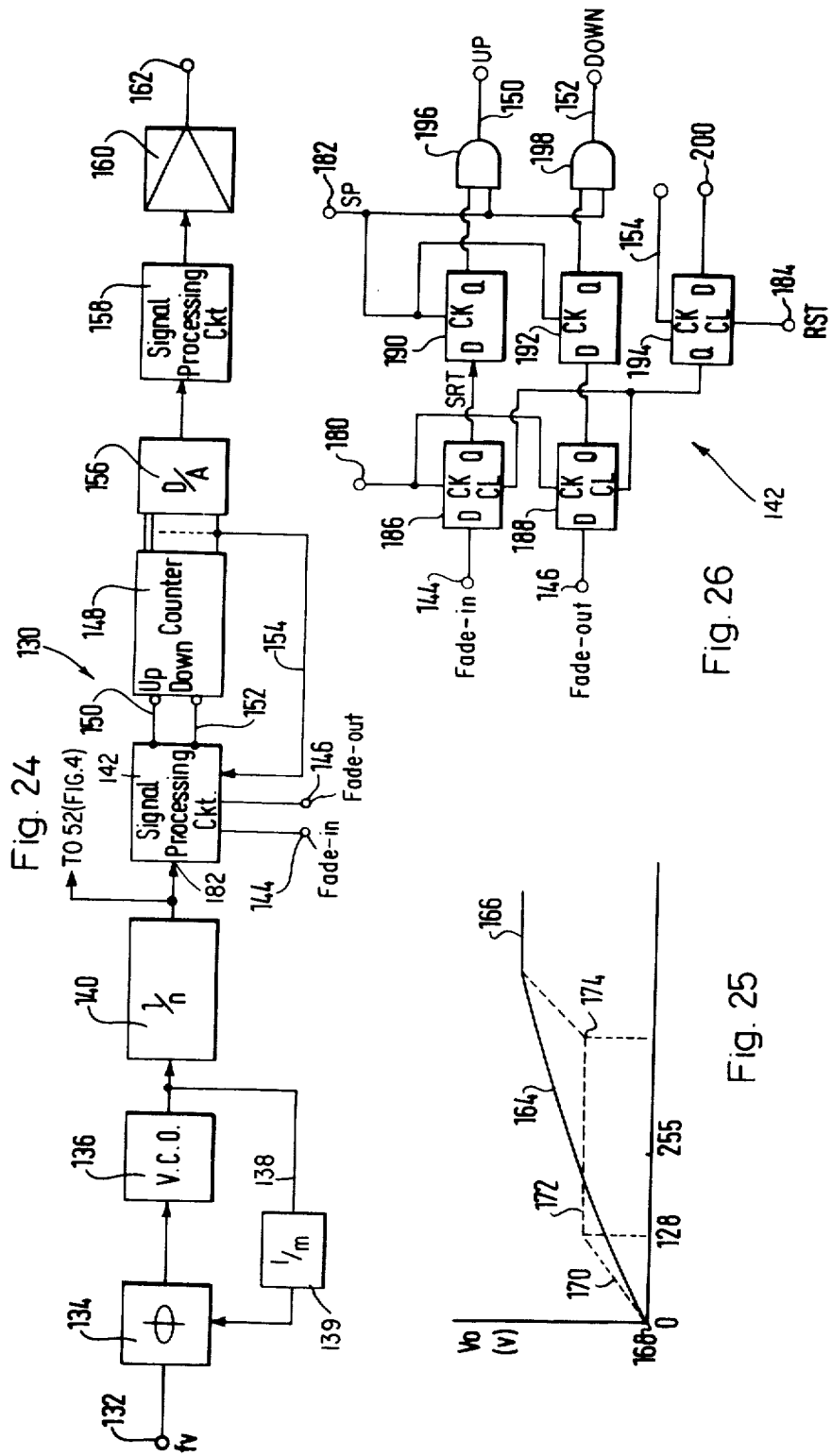

DIGITALLY CONTROLLED VIDEO DISSOLVE CIRCUIT

BACKGROUND OF THE INVENTION

This invention relates to a video signal processing circuit for producing a dissolve signal to control dissolving of a video signal.

In the prior art, a dissolve between first and second video sources is performed by applying a ramp control signal to a differential amplifier. The ramp signal proportionately increases the gain of the differential amplifier for one video signal and decreases it for the other. By adjusting the slope of the ramp control signal, the desired duration of dissolve is achieved.

The ramp control signal may be generated in an analogue circuit using resistors and capacitors to generate the basic ramp and an amplifier having controllable gain to adjust the slope of the ramp and hence the duration of the dissolve. In addition, a ramp generator has been used based on an n-bit digital counter which counts a fixed frequency such as the frame frequency. The digital number stored in the n-bit digital counter is D-A converted. The resulting analogue output signal is amplified by an amplifier whose gain is adjusted to give the desired duration. In order to achieve a long duration, n must be large. This increases the cost of the device.

Furthermore, to obtain a wide range of durations, the gain of the amplifier must be controllable over a very wide range. This gives difficulty in generating a steep ramp due to problems in maintaining linearity. The shallowness of the minimum slope is limited by the size of n.

OBJECTS AND SUMMARY OF THE INVENTION

According to an aspect of the present invention, a video signal processing circuit for producing a dissolve signal to control dissolving of a video signal by control of its amplitude in a gain control circuit which is, in turn, controlled by a digitally generated ramp control signal comprises means for generating a clock signal having a frequency which is synchronous with a vertical synchronizing signal of said video signal; means for frequency-dividing said clock signal by a preset value n; means for counting said frequency-divided clock signal during at least one vertical period of said video signal; and means for converting the digital output of said counting means into a corresponding analogue signal, whereby said analogue signal is supplied to said gain control circuit as said control signal.

In a preferred embodiment of the invention, a control frequency is generated in a ramp signal generator by multiplying the frame frequency by a digitally controllable factor, and then such control frequency is used to generate the ramp signal.

The ramp signal generator has a phase locked loop which generates a signal which is a fixed multiple M of the frame frequency. This signal is divided by a controllable factor n to provide the control frequency. In the preferred embodiment, $M=256$ and $1 \leq n \leq 255$. The divided signal is fed to a digital up-down counter, suitably of 8 bits, and the resulting changing digital value is fed through a fixed-gain amplifier to the dissolve switcher. With a frame frequency of 30 Hz and the values given above, a duration of from about 0 to about 8.5 seconds can be achieved using an 8-bit counter.

If a duration longer than 8.5 seconds is selected, the ramp signal generator pauses midway through the ramp pending a restart signal which permits it to complete the dissolve.

It has been noted that the human observer is unable to perceive any change in the displayed picture during initial and terminal portions of a dissolve. The human observer therefore perceives a dissolve having a shorter duration than the desired duration. A signal processing circuit is provided in the ramp signal generator of the preferred embodiment which begins the ramp at a level at which dissolve can be perceived and ends it when the dissolve can no longer be perceived. This is performed in a rising lamp, for example, by immediately adding an increment of voltage to the ramp control signal at the start of the dissolve and adding a second increment of voltage at the end of the dissolve. The gain of the fixed-gain amplifier compensates for the fact that the actual excursion of the ramp is smaller by the sum of the two added voltages.

The above, and other objects, features and advantages of the invention will be apparent in the following detailed description of the invention which is to be read in connection with the accompanying drawings.

BRIEF DESCRIPTION OF THE DRAWINGS

FIG. 1 is a block diagram of a signal processing circuit according to the present invention;

FIGS. 2A and 2B are diagrams showing the effect on a television screen obtained by operating the signal processing system shown in FIG. 1;

FIGS. 5 and 6 are waveform diagrams used for explaining the operation the circuit shown in FIG. 4;

FIG. 7 is a diagram relating the waveforms in FIG. 5 to their result on a picture on a television screen;

FIG. 8 is a waveform diagram used for explaining the operation of other portions of the circuit shown in FIG. 4;

FIG. 9 is a diagram relating the waveforms in FIG. 8 to their result on a television picture;

FIGS. 10, 11, 12, 13, 14, 15 and 15' are diagrams showing the manner in which wipe and key of television pictures can be controlled using the circuit shown in FIG. 4;

FIG. 16 is a diagram comparing a terraced television picture with an unterraced picture;

FIGS. 17, 18 and 19 are diagrams showing television pictures and waveform diagrams associated therewith used for the explanation of the softedge circuit shown in FIG. 4;

FIG. 24 is a block diagram showing an example of the dissolve signal generator which is used together with the circuits shown in FIGS. 1 and 3;

FIG. 25 is a graph showing a waveform which is used for explaining the operation of the dissolve signal generator shown in FIG. 24;

FIG. 26 is a block diagram showing an example of a practical circuit of a signal processing circuit;

DETAILED DESCRIPTION

Figure 3:
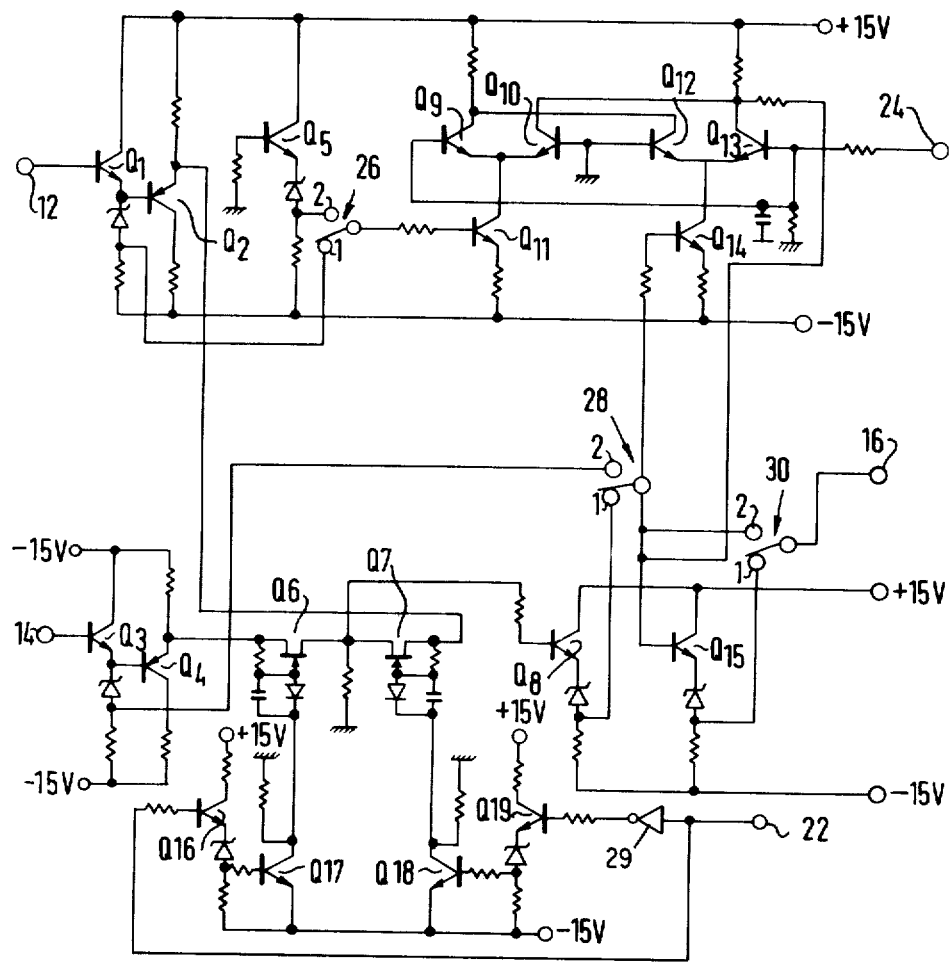
FIG. 3 is a schematic diagram of a practical circuit of the system shown in FIG. 1.

FIG. 1 is a block diagram showing the signal processing system embodying a video special effects generator 10 according to the present invention.

A wipe and key switcher 18 permits insertion or removal of part of a second picture from a first displayed picture. A dissolve switcher 20 permits fading in or fading out either one of two pictures or a keyed composite of two pictures from the wipe and key switcher 18.

In the figure, signal processing system 10 has two input terminals 12 and 14 and an output terminal 16. Video signals to be processed are fed to the input terminals 12 and 14, respectively. The wipe and key switcher 18 receives a wipe and key switching pulse applied to an input terminal 22 connected thereto, while the dissolve switcher 20 receives a dissolve control signal applied to an input terminal 24 connected thereto. The wipe and key switcher 18 also receives first and second video signals fed to the terminals 12 and 14 and has an output terminal connected to a fixed contact 1 of a switch 28. A switch 26 is also provided which has one fixed contact 1 connected directly to the input terminal 12 and the other fixed contact 2 grounded. The switch 28 its the other fixed contact 2 connected directly to the input terminal 14. Signals delivered to the movable contacts of the switches 26 and 28 are fed to inputs of the dissolve switcher 20 whose output is delivered to a fixed contact 1 of a switch 30. The movable contact of the switch 28 is also connected directly to the other fixed contact 2 of the switch 30. The movable contact of the switch 30 is connected to the output terminal 16.

In the above signal processing system 10, when the movable contact of the switch 26 is connected to its fixed contact 2, the movable contact of the switch 28 to its fixed contact 1 and the movable contact of the switch 30 to its fixed contact 2, the output from wipe and key switcher 18 is delivered to the output terminal 16, whereby the wipe (key) mode is set. When the movable contact of switch 26 is connected to its fixed contact 1, that of the switch 28 to its fixed contact 2 and that of the switch 30 to its fixed contact 1, the output from dissolve switcher 20 is delivered to the output terminal 16, whereby the dissolve (fade) mode is provided. Furthermore, if the switches 26, 28 and 30 are connected with their respective fixed contact 1, as shown in FIG. 1, key-in (or key-out) can be achieved, if the movable contact of the switch 26 is changed over to its fixed contact 2 from the switching condition of FIG. 1, the key-with-fadein(out) operation will be achieved.

FIG. 2A shows a chart of the key-in (key-out) operation of the screen. Firstly, the screen (a) imaging only picture A is dissolved to the screen (b) in which a portion of picture B is superimposed on the picture A, and then the key screen (c) in which the portion of picture B is inserted in the picture A. The technique of picture conversion from FIG. 2A (a) to FIG. 2A (c) is called the key-in operation, while the technique of picture conversion from FIG. 2A (c) to FIG. 2A (a) is called the key-out operation. In the signal processing system 10 shown in FIG. 1, the video signal which corresponds to the picture A is applied to input terminal 12 and the video signal which corresponds to the picture B is applied to input terminal 14. In this case, the wipe and key switcher 18 provides a video signal which produces the picture represented by FIG. 2A (c). At this time, the movable contacts of switches 26 and 28 are connected to their fixed contacts 1, respectively, so that the dissolve switches 20 is supplied with the video signals corresponding to the pictures represented by FIG. 2A (a) and (c). The dissolve switcher 20 dissolves both the input video signals such that the video signal corresponding to the picture represented by FIG. 2A (b) is delivered to the output terminal 16 through the switch 30 whose movable contact is connected to the fixed contact 1 thereof.

FIB. 2B is a chart showing pictures of the key-with-fade in (out) operation by operating the switches 26, 28 and 30 of the signal processing system 10 shown in FIG. 1. From a picture screen which is initially black as shown in FIG. 2B (a), a picture consisting of the picture portions A and B appears gradually as shown in FIG. 2B (b), and finally a picture combined of the picture portions A and B appears fully bright as shown on a picture screen (c) in FIG. 2B. The technique in which the combined picture of pictures A and B are faded-in in the order of (a), (b) and (c) as described above is called the key-with-fade-in operation, while the technique in which the picture on the screen (c) of the key state is converted to a black screen (a) through the picture on the screen (b) is called the key-with fadeout operation. The above effects on the television screen are achieved by connecting the movable contact of the first switch 26 to its fixed contact 2 and that of the second switch 28 to its fixed contact 1 and by dissolving the black video signal from the first switch 26 and the output signal from the wipe and key switcher 18 in the dissolve switcher 20.

Keying is performed by switching between input signals A and B at selectable times. For example, the left half of each horizontal line may receive the left half of picture A, and the right half may receive the right half of picture B. That is, at the midpoint of each horizontal line the wipe and key switcher substitutes video B and at the beginning of each line restores video A. A wipe is performed by systematically changing the point on the horizontal lines at which the transition from A to B occurs. If the transition is made progressively earlier from frame to frame, the wipe moves to the left with the B picture expanding while the A picture shrinks until the screen is filled with the B picture and the A picture is no longer seen. Similar effects are achieved in the vertical direction.

A dissolve is performed by having one displayed picture disappear over time while a second picture is made to appear over the same time period. If one of the pictures is black, the resulting effect is called a fade out or fade in. Dissolves are performed by dissolve switcher 20 in response to a ramp-shaped dissolve control signal at input terminal 24. During the ramp signal, dissolve switcher 20 substitutes the picture from switch 28 for the picture from switch 26 at a rate which is determined by the slope of the ramp signal.

FIG. 3 is a diagram showing an example of a practical circuit of the signal processing system 10 shown in FIG. 1. In FIG. 3, transistors $Q_1$ and $Q_2$ buffer the video signal applied to the input terminal 12, while transistors $Q_3$ and $Q_4$ buffer the video signal applied to the input terminal 14. Transistors $Q_6$, $Q_7$, $Q_{16}$, $Q_{17}$, $Q_{18}$ and $Q_{19}$ form the wipe and key switcher 18, and transistors $Q_9$, $Q_{10}$, $Q_{11}$, $Q_{12}$, $Q_{13}$ and $Q_{14}$ from the dissolve switcher 20. The other transistors $Q_5$, $Q_8$ and $Q_{15}$ are provided for voltage balance or impedance conversion.

When the wipe and key signal at input terminal 22 is high, the B video signal at input terminal 14 is connected through $Q_6$ and $Q_8$ to terminal 1 of switch 28 and thence through terminal 2 of switch 30 to output terminal 16. $Q_7$ is held non-conducting at this time due to the inversion of the wipe and key signal in inverter 29 in the path to transistor $Q_7$. Thus the A video signal at input terminal 12 is blocked at $Q_7$ and does not appear at output terminal 16.

Figure 4:
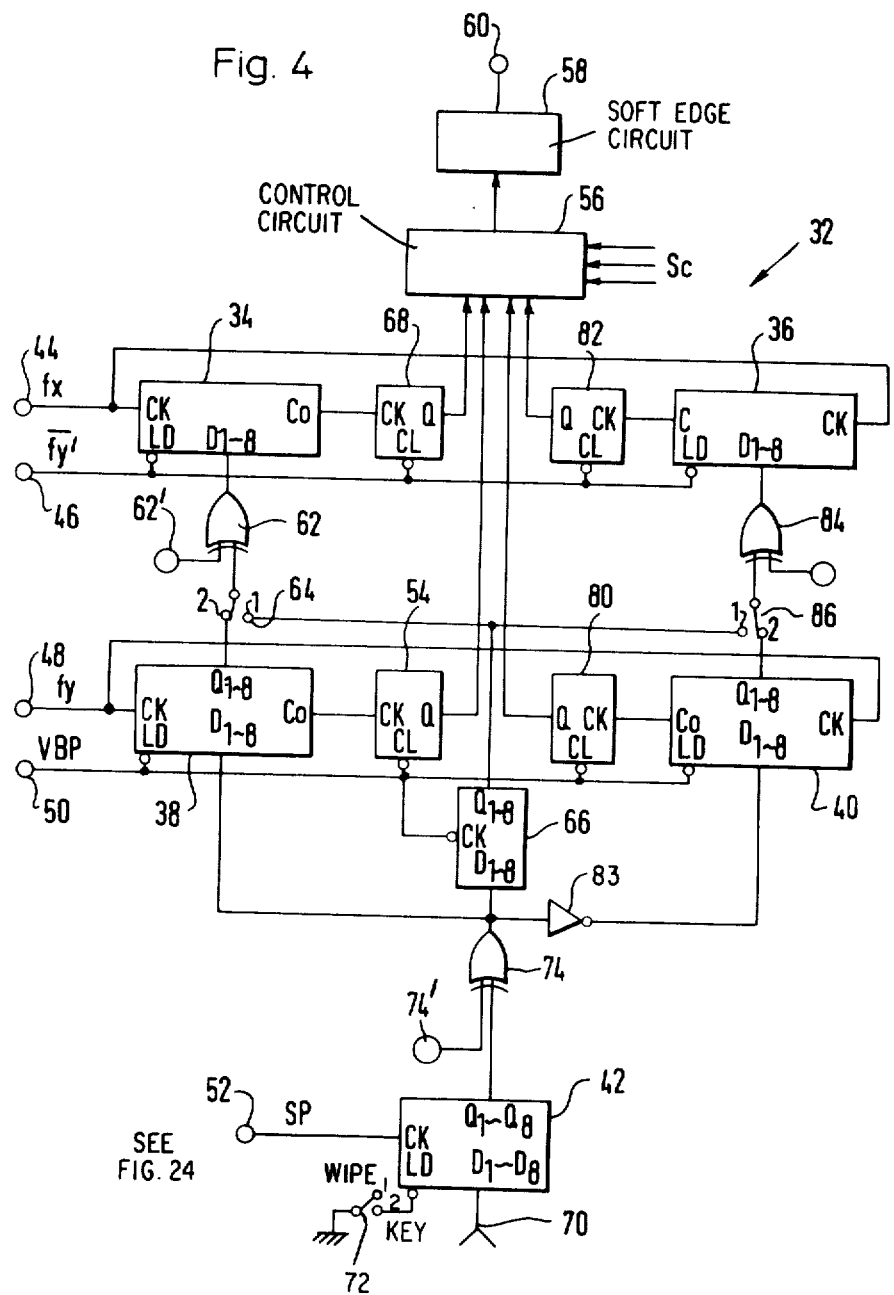
FIG. 4 is a block diagram showing a wipe (key) generator which is used with the circuits shown in FIGS. 1 and 3.

FIG. 4 is a block diagram showing an example of circuit for generating the key and wipe switching pulse which is applied through the terminal 22 to the wipe and key switcher 18. Digital counters, loaded with preset numbers and clocked by appropriate clock signals, determine the points at which switching takes place both vertically and horizontally. In this example, a wipe (key) generator, shown generally at 32, includes an $X_1$ counter 34, $X_2$ counter 36 for establishing the positions along the lines at which switching occurs, $Y_1$ counter 38, $Y_2$ counter 40 for establishing the vertical positions at which switching occurs and speed counter 42 for determining the rate at which a wipe moves across and/or up and down the screen. The $X_1$ and $X_2$ counters 34 and 36 are supplied with a clock signal $f_x$ applied to a terminal 44. The clock signal has a high enough frequency to just fill counters $X_1$ and $X_2$ during each horizontal line when they contain zero at the beginning of the line. When a non-zero number is loaded into these counters, they become filled and produce an overflow bit at a time determined by the magnitude of the stored number. The overflow bit triggers the transition between A and B video sources. The $X_1$ and $X_2$ counters may be loaded with different numbers. The $X_1$ counter may be used, for example, to key the transition from A to B video and thereafter, the $X_2$ counter may be used to trigger the return transition from B to A video. Thus, a segment of B video is embedded within a line of A video. The $Y_1$ and $Y_2$ counters operate similarly to control the transitions between A and B video in the vertical direction.

The clock signal $f_x$ has a frequency corresponding to 4/3 fsc (fsc: frequency of chrominance subcarrier signal), prepared by multiplying the subcarrier frequency (3.58 MHz) by 4 and counting-down the multiplied frequency by ⅓. The $X_1$ and $X_2$ counters 34 and 36 are supplied at their load input terminals with a signal $\overline{f_y'}$ fed to a terminal 46. This signal $\overline{f_y'}$ consists of narrow width pulses formed from the half-H rejected horizontal synchronizing signal. The $Y_1$ and $Y_2$ counters 38 and 40 are supplied at their clock input terminals with a signal $f_y$ applied to a terminal 48 and also at their load input terminals with a signal VBP fed to an input terminal 50, respectively. The signal $f_y$ is the half-H rejected horizontal synchronizing signal and the signal VBP is the vertical blanking pulse, respectively. The speed counter 42 is supplied at its clock input terminal with a speed pulse signal SP fed to a terminal 52. As hereinafter described in detail, the speed pulse SP determines the wipe speed.

Each of counters 34, 36, 38, 40 and 42 comprises an 8-bit counter, so that each produces a carry signal at a count of 256. Each of these counters has data input terminals which receive data input signals of 8 bits. The $Y_1$ and $Y_2$ counters 38 and 40 and the speed counter 42 have data output terminals of 8 bits. These counters can be preset to a desired counting condition by applying data desired to be preset to their data input terminals at a time when a load signal having a level "0" is applied to their load input terminals.

As will be described later, the system consisting of $X_1$ counter 34 and $Y_1$ counter 38 operate complementary to the system consisting of $X_2$ counter 36 and $Y_2$ counter 40. Accordingly, for the sake of simplifying the explanation, the system consisting of $X_1$ counter 34 and $Y_1$ counter 38 is described, and thereafter the system consisting of $X_2$ counter 36 and $Y_2$ counter 40 will be described in connection with the system consisting of $X_1$ counter 34 and $Y_2$ counter 38.

According to the standard of the NTSC system, one frame of the video signal includes 525 video lines, each of which contains one horizontal synchronizing pulse, and hence, one field includes 262.5 video lines. Now, it is assumed that initially the speed counter 42 is in its cleared state and the data of 8 bits to the $Y_1$ counter 38 is "0".

The vertical blanking pulse VBP applied to terminal 50 has the waveform illustrated in FIG. 5a, which comprises a 9H time period having a low level and the following 253.5H having a high level. When the vertical blanking pulse VBP with the waveform shown on FIG. 5a is fed to the $Y_1$ counter 38 at its load input terminal, the $Y_1$ counter starts to count the signal $f_y$ fed to terminal 48 after the VBP pulse becomes "1". In fact, however, the vertical blanking signal VBP is normally selected to be somewhat shorter than 9H, for example 8.5H, as shown in FIG. 5(b). Therefore if zero is loaded into the $Y_1$ counter the carry from the $Y_1$ counter is not produced until the subsequent, vertical blanking pulse. If the data "1" is loaded at the data input terminal of $Y_1$ counter 38 by speed counter 42, the carry is produced from the $Y_1$ counter 38 just before the leading edge of the subsequent blanking pulse as shown in FIG. 5c. Further, when the data "2" is loaded, the carry appears 2H before the leading edge of the blanking pulse VPB. Thus, it is noted that if the data "n" ($0 \leq n \times 255$) is loaded at the data input terminal of the Y counter, the carry appears nH before the leading edge of the subsequent blanking pulse. The carry signal from the $Y_1$ counter 38 sets a latch D flip-flop 54 as a clock signal. The set output of the D flip-flop triggers the transition between A and B video at the time determined by nH. This D flip-flop 54 is supplied at its clear input terminal with the vertical blanking signal VBP fed to terminal 50.

FIGS. 6a, 6b and 6c show the vertical blanking pulse VBP, the carry signal which is produced from the $Y_1$ counter 38 when the data "n" is loaded and a Q-output of the latch D flip-flop 54, respectively. The latch flip-flop 54 is triggered by the carry signal and reset by the pulse VBP, so that a $Y_1$ switching signal shown in FIG. 6C will be generated from the Q-output of the latch flip-flop 54. When this $Y_1$ switching signal is fed through a control circuit 56, a soft edge circuit 58 and an output terminal 60 to the terminal 22 shown in FIGS. 1 and 3 as the wipe (key) switching pulse, the picture A is selected during the low level of $Y_1$ switching signal and during the high level thereof the picture B is selected in the wipe and key switcher 18. Accordingly, a picture as shown in FIG. 7 will be produced on the television screen.

If data "n" which increases at every vertical interval is loaded at the data input terminal of the $Y_1$ counter 38, picture B is expanded or wiped upwards gradually as indicated by the arrows in FIG. 7 and finally occupies the whole screen. On the contrary, if the data "n" decreases gradually when it is loaded in the $Y_1$ counter at every vertical interval, the picture portion A is expanded downwards and finally occupies the whole screen. If the preset data from the speed counter 42 is fixed, the picture in the key state can be produced on the screen.

Next, the operation of $X_1$ counter 34 will be explained with reference to FIG. 8. The $X_1$ counter 34 is supplied with 8 bits of data from an exclusive OR-gate 62. Though only one exclusive OR-gate 62 is shown in FIG. 4 for simplicity, in a practical circuit there are 8 OR-gates corresponding to the 8 bits in counter $X_1$. One of the input terminals of OR-gate 62 is connected to the movable contact of a switch 64 whose one fixed contact 1 is connected to the 8-bit output terminal of a latch circuit 66 and whose other fixed contact 2 is connected to the 8-bit output terminal of the $Y_1$ counter 38, respectively. Depending on whether a "1" or a "0" is applied to the second inputs of the gates 62, the data from counter 38 is either inverted or uninverted.

Now, it is assumed that the input data from speed counter 42 is "0" and the movable contact of switch 64 is connected to its fixed contact 1. As described previously, the frequency of the clock signal $f_x$ to the $X_1$ counter 34 is selected to be the subcarrier frequency 3.58 $MH_z$ 4/3. If the subcarrier frequency 3.58 $MH_z$ were selected as the clock signal $f_x$, the number of pulses available to be counted in IH duration is only 227. 227 pulses is insufficient to generate the carry in an 8 bit counter during a horizontal interval. When the frequency of the clock signal $f_x$ is selected to be $3.58 \times 4/3$ $MH_z$, the number of pulses to be counted in IH period is 303.3. To count 255 pulses in IH duration the width of the load pulse to the $X_1$ counter 34 is selected about 10 $\mu$s (micro seconds). Thus, the load pulse has the same width as the horizontal blanking pulse. For this reason, the load input signal to input terminal 46 is the pulse $\overline{f_y'}$ (shown in FIG. 8a) produced from the half-H rejected H synchronizing signal having a low level period of about 10 $\mu$S. This period is equivalent to the period of 49.3 pulses of the signal $f_x$ (FIG. 8b) having the frequency $3.58 \times 4/3$ $MH_z$. Accordingly, the period of signal $\overline{f_y'}$ in high level corresponds to the period of 254 pulses of the signal $f_x$. Thus in the same manner as the $Y_1$ counter 38, the carry bits can be generated at the desired horizontal position in response to the corresponding preset value applied to the data input terminal of the $X_1$ counter 34. The carry signal therefrom is fed to a D flip-flop 68 as a clock input signal. The flip-flop 68 is supplied at its clear input terminal with the signal $\overline{f_y'}$ fed to the terminal 46, so that it produces at its Q-output terminal an X switching pulse shown in FIG. 8d. This X switching pulse is fed through the control circuit 56, soft edge circuit 58 and output terminal 60 to the terminal 22, shown in FIGS. 1 and 3, as the key and wipe switching pulse. In this case, if the wipe and key switcher 18 is such that the signal corresponding to the picture A is delivered during the low level of the X switching pulse and the signal corresponding to the picture B is delivered during the high level of the X switching pulse, on the television screen the picture portion B is expanded to the left gradually as n increases gradually with respect to the succeeding H blanking pulses as shown in FIG. 9 and finally occupies the whole screen, while the picture portion A is expanded to the right gradually as n decreases gradually and finally occupies the whole screen. When the input data value to the $X_1$ counter 34 is fixed, the key state in which the picture portions A and B are not changed is produced on the screen.

The above describes the case in which the movable contact of switch 64 is connected to its fixed contact 1. If the movable contact of switch 64 is moved to its other fixed contact 2, the $X_1$ counter 34 is supplied with the 8 bit input data from the $Y_1$ counter 38. If it is assumed that the output from the speed counter 42 is "0", the 8-bit output data from the $Y_1$ counter 38 is loaded into the $X_1$ counter 34 at every horizontal interval. Since the $Y_1$ counter 38 counts the horizontal synchronizing pulse $f_y$ fed to terminal 48 during the high level period of the vertical blanking signal shown in FIG. 5b, the output data from the $Y_1$ counter 38 increases by 1 at every H interval. This output data from the $Y_1$ counter 38 is loaded to the $X_1$ counter 34 at the time when the load pulse $\overline{f_y'}$ having the horizontal sychronizing frequency is applied thereto and then the $X_1$ counter 34 counts up the clock pulse $f_x$ from the load value. Therefore, it is to be noted that the generation of the carry output from the $X_1$ counter 34 is shifted to the left by one pulse $f_x$ every time the Q-outputs of the $Y_1$ counter 38 increases. Thus the output data from the $Y_1$ counter 38 is "0" in the first horizontal interval, so that the carry output from the $X_1$ counter 34 falls within the subsequent H blanking period. Next, when the output data from the $Y_1$ counter 38 becomes "1", in the second horizontal interval, the carry output from the $X_1$ counter 34 appears at the position of 1 pulse before the subsequent horizontal sync signal which corresponds to the right upper side of the screen. In this manner, when the $Y_1$ counter 38 counts 254 H, the carry from the $X_1$ counter 34 appears at the position of 254 pulses before the subsequent horizontal sync signal which corresponds to the lower left side of the screen. If the succeeding carry outputs from the $X_1$ counter 34 which are formed in the above manner are used to set the D flip-flop 68 and in turn this D flip-flop 68 is reset by the clear pulse $\overline{f_y'}$, the flip-flop 68 produces X-switching pulses which cause the picture on the television screen to diagonally divided between the picture portions A and B as shown in FIG. 10.

If the speed counter 42 counts up at a certain speed, the output from the $Y_1$ counter 38 is offset by an amount corresponding the output data from the speed counter 42. Accordingly, each time the speed counter 42 counts up, such as "0", "1" ... "n", ... "255", the diagonal dividing line on the television picture moves toward the top of the screen as shown in FIG. 11. On the contrary, when the contents of the speed counter 42 is counted down, such as "255", ..., "n", ..., "1", "0", the diagonal boundary moves downwards. The 8-bit speed counter 42 is supplied at its clock input terminal with the wipe speed pulse SP fed to the terminal 52 and also at its data input terminal with the key size data through a line 70. When a switch 72 is closed and hence the load input terminal of speed counter 42 is grounded, the content of this speed counter 42 is fixed by the key data and the wipe (key) generator 32 is changed from the wipe generation mode to the key generation mode.

The data output from the speed counter 42 is applied to an exclusive OR-gate 74. Only one OR-gate 74 is shown in FIG. 4, but in practice the number of OR-gates 74 corresponds to the bit number of the data outputs from the speed counter 42. A control input terminal 74' is provided for the exclusive OR-gate 74. As well known, when the state of a control input to the control input terminal 74' is selectively changed to high or low, the speed counter 42 can be operated as an up-counter or down-counter, respectively. For example, in the wipe mode of the composite television picture consisting of the picture portions A and B shown in FIG. 12, when the control input to the exclusive OR-gate 74 is changed, a wipe in the direction 76 or 78 (in FIG. 12) is reversed.

The exclusive OR-gate 62 is provided with a control input terminal 62' which is operated similar to the control input terminal 74'. The exclusive OR-gate 74 controls the whole operating direction of the wipe generator 32, while the exclusive OR-gate 62 merely determines the direction of the wipe operation in the horizontal direction. The levels of the control signals fed to the control input terminals 62' and 74' are controlled in response to the wipe pattern and key pattern desired.

The wipe (key) generator 32 shown in FIG. 4 is also provided $Y_2$ counter 40 similar to the $Y_1$ counter 38, $X_2$ counter 36 similar to the $X_1$ counter 34, exclusive OR-gate 84 similar to the exclusive OR-gate 62, switch 86 similar to the switch 64, D flip-flop 80 similar to D flip-flop 54 which receives the carry output from the $Y_2$ counter 40, and D flip-flop 82 similar to the D flip-flop 68 which receive the carry output from the $X_2$ counter 36. The 8-bit data output from the exclusive OR-gate 74 is applied directly to the $Y_1$ counter 38 but through an inverter 83 to the $Y_2$ counter 40. This inverter 83 is used for complementary operation of the $Y_2$ counter 40 relative to the $Y_1$ counter 38. That is, if a composite Y switching pulse is formed from the $Y_1$ and $Y_2$ switching pulses, there is produced a picture in which the upper and lower picture portions B are wiped over the picture portion A therebetween as shown in FIG. 13a, or a picture in which the picture portion B between the upper and lower picture portions A is wiped over the picture portions A as shown in FIG. 13b. Similarly, if the movable contacts of switches 64 and 86 are connected to their fixed contacts 1, respectively, and the levels of the control inputs to the exclusive OR-gates 62 and 84 are different a composite X switching pulse of the $X_1$ and $X_2$ switching pulses produces a picture in which the left and right picture portions B are wiped to the picture portion A therebetween as shown in FIG. 14a, or in which the picture portion B between the left and right picture portions A is wiped over both the picture portions A as shown in FIG. 14b. Next, if the movable contacts of switches 64 and 86 are connected to their fixed contacts 2, respectively, and the composite switching pulses are produced from the $X_1$, $Y_1$ switching pulses and $X_2$, $Y_2$ switching pulses, pictures can be obtained in which the picture portions A and B are wiped as shown in FIGS. 15a, 15b, 15c and 15d, respectively.

In addition to the foregoing, if the conditions of the control inputs to the exclusive OR-gates 62, 74 and 84 are selectably changed, the switches 64 and 86 are controlled and the combination of $X_1$, $X_2$, $Y_1$ and $Y_2$ switching pulses is selected in the manners, various wipe effects shown in FIG. 15' can be obtained on the screen.

In FIG. 4, as described previously, there is provided a latch circuit 66 which receives at its data input terminal the 8 bit output data from the speed counter 42 through the exclusive OR-gates 74. This latch circuit 66 has a clock input terminal which receives the vertical blanking pulse VBP fed to the terminal 50, and a data output terminal from which the 8 bit data output is fed to the data input terminals of the $X_1$ counter 34 and $X_2$ counter 36 through the fixed contacts 1 of switches 64 and 86 and the exclusive OR-gates 62 and 84, respectively. The $X_1$ and $X_2$ counters 34 and 36 are loaded with the input data at every load pulse $\overline{f_y'}$ having the horizontal synchronizing frequency. If the latch circuit 66 is omitted, the $X_1$ and $X_2$ counters 34 and 36 are directly loaded with whatever data exists the speed counter 42 at each horizontal interval. This means that the data of speed counter 42, which may change at certain horizontal intervals, could control the data in the $X_1$ and $X_2$ counters during a field rather than only during the vertical blanking period. For this reason, the boundary between the two picture portions A and B is not a straight line but is terraced, as shown in FIG. 16a. In order to avoid terracing, the output data from speed counter 42 is latched by the pulse VBP having the vertical synchronizing frequency and is held during one field period. The held data in the latch circuit 66 is used as the preset data for the $X_1$ and $X_2$ counters 34 and 36, so that the steps shown in FIG. 16a disappear and the boundary line between the picture portions A and B becomes straight, as shown in FIG. 16b. In FIG. 16, numeral 90 designates the boundary line at the first field and 92 designates the boundary line at the subsequent field, respectively. As the wipe speed becomes faster the distance between the boundary lines 90 and 92 becomes wider. The $Y_1$ and $Y_2$ counters 38 and 40 are loaded with the output data from the speed counter 42 by the vertical synchronizing blanking pulse VBP, so that there is no need to provide such a latch circuit for the $Y_1$ and $Y_2$ counters 38 and 40.

The control circuit 56 shown in FIG. 4 is supplied with the $X_1$ switching pulse from the flip-flop 68, the $Y_1$ switching pulse from the flip-flop 54, the $X_2$ switching pulse from the flip-flop 82, and the $Y_2$ switching pulse from the flip-flop 80. This control circuit 56 contains gates which produce various types of composite switching pulses in response to a control logic signal $S_c$ applied thereto.

The soft edge circuit 58 shown in FIG. 4 receives the sharp-edged composite switching pulse from the control circuit 56 as shown in FIG. 17a. This would cause the border line between the picture portions A and B to rapidly change, as shown in FIG. 17b. This produces an annoyingly short transition in the displayed picture. If the composite switching pulse is shaped to have a slope in the transition period as shown in FIG. 17c, the signals corresponding to the picture portions A and B are mixed with each other in that period. Accordingly, the boundary between the picture portions A and B becomes visually soft, as shown in FIG. 17d. A soft transition is more attractive to the viewer.

In the prior art, the soft edge effect was achieved by analogue multiplication of, the signals of the picture portions A and B. Conventional analogue circuits for this application are complicated and expensive. In the soft edge circuit 58 of the present invention the composite switching signal from the control circuit 56 is processed in digital manner to achieve the desired soft edge.

As shown in FIG. 18b, the soft edge circuit 58 generates a rapid series of switching pulses in the boundary area A+B of the picture portions A and B shown in FIG. 18a. It should be noted that the mark to space ratio of the pulses in FIG. 18c increases continuously. The mark to space ratio or duty cycle is low at the boundary portion A+B near the picture portion A but becomes high near the picture portion B. Due to the visual integration by the observer, the effect on the screen of a picture with a rapidly switched soft edge is similar to the soft edge achieved by the analogue method. Since the soft edge effect is performed by the digital processing of the switching signal, the linearity in the boundary portion A+B is improved.

In addition to the soft edge effect in the vertical direction, a similar digital technique is employed to yield the soft edge effect in the horizontal direction.

FIG. 19a shows a screen in which the boundary portion A+B between the upper and lower picture portions A and B is subjected to soft edging. In this case, the boundary portion A+B includes nH lines. A line near the upper picture portion A is switched between A and B video by a pulse whose duty cycle is low as shown in FIG. 19b thus displaying predominantly A video with short segments of B video. The last line of n lines nearest picture portion B is switched by a pulse whose duty cycle is highest, as shown in FIG. 19c thus displaying predominantly B video with short segments of A video. The duty cycle varies smoothly from line to line. Thus, the boundary portion A+B is soft-edged by smoothly changing the distribution of the signals corresponding to the picture portions A and B.

Figure 20:
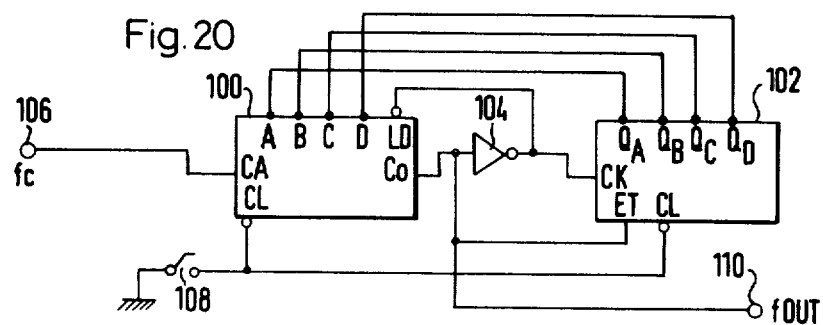
FIG. 20 is a block diagram of the soft-edge generator.

FIG. 20 is a block diagram showing a portion of the circuit 58. The soft edge circuit shown in FIG. 20 consists of two 4-bit counters 100 and 102 and an inverter 104. An integrated circuit type SN 74161 made by Texas Instruments Inc. can be used for each of the above counters. The set outputs $Q_A$, $Q_B$, $Q_C$ and $Q_D$ of counter 102 are fed back to corresponding data inputs A, B, C and D of counter 100. A clock signal $f_c$ applied to an input terminal 106 is fed to the first counter 100 at its clock input terminal. If no clear input signal is applied to the counter 100 at its clear input terminal by clear switch 108, the counter 100 produces a carry output signal when it counts the 16th clock pulse. The carry output signal is inverted by an inverter 104 and then fed to the clock input of the second counter 102 and to the load input of the first counter 100. When the load input of counter 100 becomes low by the above load input, the first counter 100 is preset by the data at data inputs A, B, C and D from set outputs $Q_A$, $Q_B$, $Q_C$ and $Q_D$ respectively of the second counter 102. At the arrival of the first carry pulse from counter 100, the second counter 102 produces the output of "0" from all set outputs and hence the first counter 100 is preset to "0". At the end of the first carry pulse, a valve "1" is stored in counter 102. Next, the first counter 100 is preset by the value "1" by the "1" stored in counter 102 at the next carry output. In this manner, the first counter 100 is preset up to "15". As a result, an output terminal 110 connected with the carry output terminal of the first counter 100, provides a sub-pulse signal $f_{OUT}$ having a changing period which becomes narrower at the occurrence of each pulse of the clock signal $f_c$. The composite switching signal with the soft edge effect is obtained by suitably gating the composite switching signal from the circuit 56 with the pulse signal $f_{OUT}$.

Figure 30:
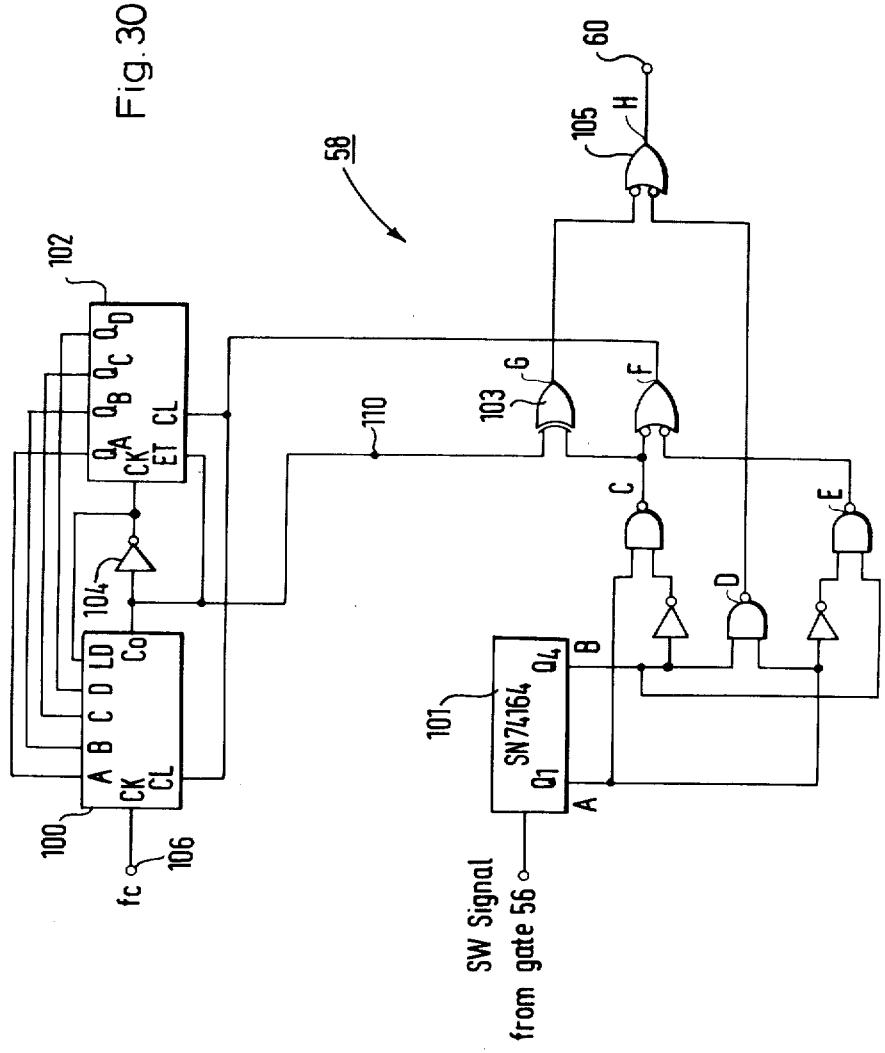
FIG. 30 shows the soft edge generator of FIG. 20 in greater detail.
Figure 31:
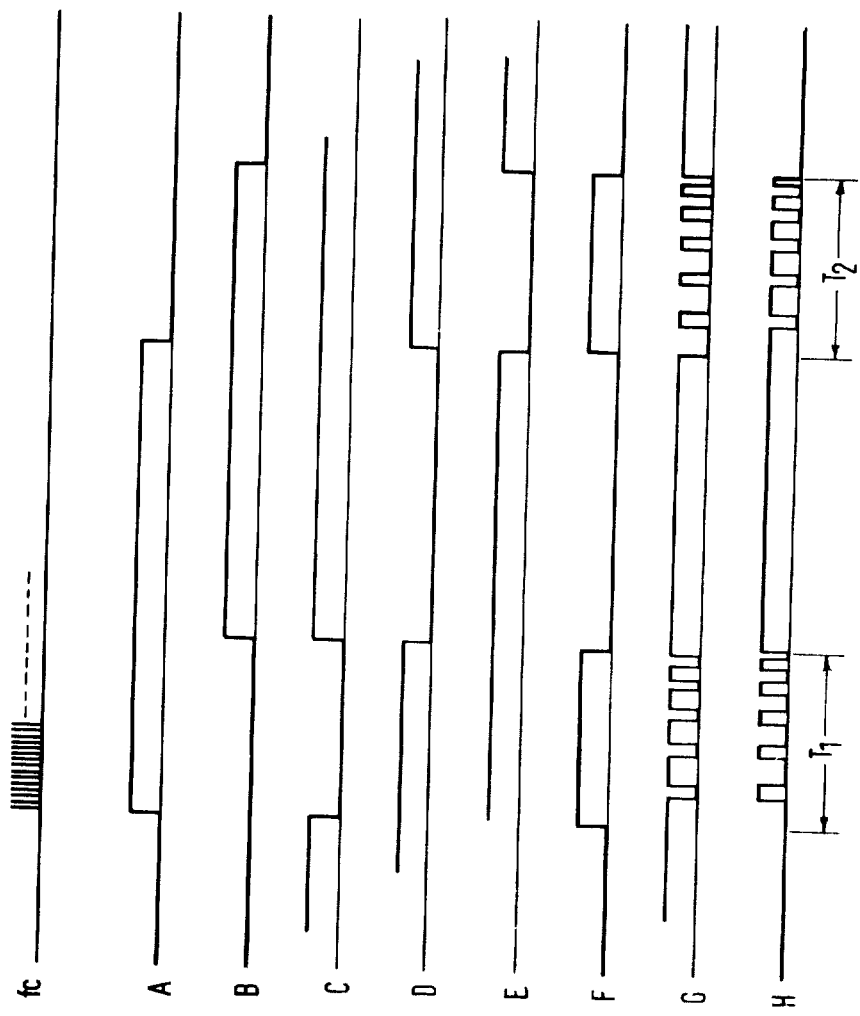
FIG. 31 illustrates waveforms produced by the soft edge generator of FIG. 30.

FIG. 30 shows a complete circuit diagram of the soft edge effect generator. The upper portion of this circuit corresponds to the circuit of FIG. 20 which generates a series of pulses having different mark to space ratios at each cycle, as described above. The series of pulses from the terminal 110 are supplied to the lower portion of the circuit which contains a counter 101 and a set of gate circuits. The switching signal from the control circuit 56 (FIG. 4) is supplied to the counter 101 which produces the switching signal A and switching signal B delayed from signal A by a predetermined time corresponding to the width of the soft edge region. The switching signals A and B are processed in the gate circuits in the manner shown in FIG. 31. The signal F defining the front and back soft edge regions $T_1$ and $T_2$ in the circuits is supplied to the clear-terminals CL of the counters 100 and 102 to enable the counters while the signal F is high. Therefore, during these intervals, there is generated a series of pulses gradually reducing in mark to space ratio from the terminal 110. The series of pulses from terminal 110 are supplied to exclusive OR circuit 103 together with the signal C shown in FIG. 31 C so that the signal G shown in FIG. 31 G, is generated from the circuit 103. The signal G is further supplied to a NOR circuit 105 together with the signal D shown in FIG. 31. The circuit 105 produces the signal H shown in FIG. 31 H which is supplied to the output 60. As apparent from FIG. 31 H, the signal H has an increasing duty cycle during a front soft edge region T1 and a decreasing duty cycle during a back soft edge region T2. The signal H thus obtained is supplied to input terminal 22 of the wipe and key switcher 18 (FIG. 1) and hence the video signals respectively supplied to the inputs 12 and 14 are rapidly switched in wipe and key switcher 18 during the soft edge regions in response to the signal H. The switched video signals are supplied to the television monitor to produce the image on the screen and the rapidly switched areas of the picture are softly edged owing to the integrating effect of human eyes.

Further, it is noted that when the switching signal to the counter 101 is the horizontal switching signal from the X-counter, the clock signal $f_c$ has a relatively high frequency, for example 50 MHZ and the counters 101 and 102 are suitably 4-bit counters. However, in case of the vertical switching signal from the Y-counter, the clock signal $f_c$ has the horizontal synchronizing frequency and the counters 101 and 102 are suitably only 2-bit counters.

Figure 21:
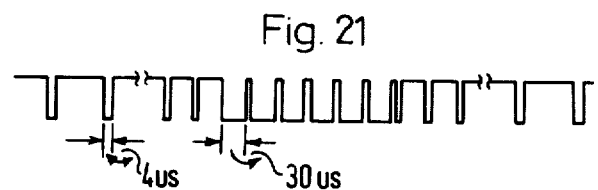
FIG. 21 shows a composite synchronizing signal.
Figure 22:
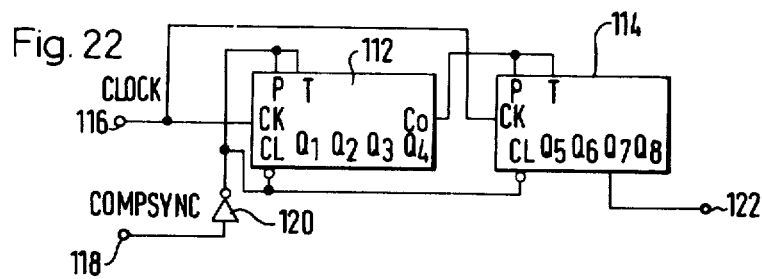
FIG. 22 shows a block diagram of a digital syne separator circuit which produces the vertical synchronizing signal fed to the circuit shown in FIG. 4.

As described above, the elements which form the wipe (key) generator 32 shown in FIG. 4 are all digital elements. Therefore, it is desired that the circuit which generates the above signals $f_y$ and $f_y'$ and VBP from the vertical and horizontal synchronizing signals separated from the composite video signal also be a digital circuit. Conventionally, in order to derive the vertical synchronizing signal from the composite synchronizing signal, an analogue circuit employing an integrating circuit is used. In the system described below, the vertical synchronizing signal is extracted in digital manner by counting out the 3.58 MHz subcarrier. As shown in FIG. 21, the waveform of the composite synchronizing signals of the video signal comprises a horizontal synchronizing signal having a pulse width of about 4μ seconds and a vertical synchronizing signal having a pulse width of about 30μ seconds. FIG. 22 is a block diagram showing a circuit which will produce a vertical synchronizing pulse using the above difference between the pulse widths of the horizontal and vertical synchronizing pulses. The vertical synchronizing separating circuit shown in FIG. 22 consists of two 4-bit counters 112 and 114 which are connected in a look-ahead connection manner to form an 8-bit counter. A texas Instrument Inc. Ser. No. 74161 integrated circuit can be employed as the counters 112 and 114. The clock input terminals of the first and second counters 112 and 114 are connected to a clock terminal 116 to receive the subcarrier signal of 3.58 MHz fed thereto, and the clear input terminals of the first and second counters 112 and 114 and the count enable input terminals P and T of the first counter 112 are connected to a terminal 118 through an inverter 120 to receive the composite synchronizing signal which is inverted by the inverter 120. The carry output terminal of the first counter 112 is connected to the count enable input terminal P and T of the second counter 114, and the $Q_7$-output of the second counter 114 is connected to an output terminal 122. Therefore, the 7th bit output signal of the 8-bit counter is delivered to the output terminal 122.

According to the circuit described just above, the 8-bit counter 112 and 114 counts about 15 pulses of the 3.58 MHz clock signal during the 4μ sec horizontal synchronizing pulse period, while the counter counts more than 100 pulses during the low level period in the 30μ sec vertical synchronizing pulse period. Accordingly, the vertical synchronizing pulse can be distinguished by detecting the output of the 7th bit of the counter since the count value 15 is indicated by (00001111) in binary number and the count value 100 is indicated by (0110 0100) in binary number.

Figure 23:
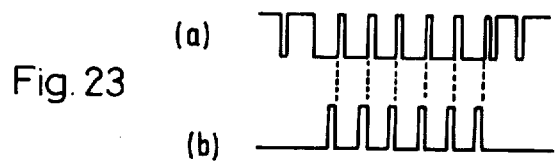
FIG. 23 shows the vertical synchronizing signal generated by the circuit in FIG. 22 related to the composite synchronizing signal.

FIG. 23a is a waveform diagram showing the composite synchronizing signal and FIG. 23b is a waveform diagram showing a waveform which is derived from the 7th bit output terminal of the counter. The pulse thus produced is shaped suitably and then fed as the signal VBP to the terminal 50 of FIG. 4.

The ramp signal fed through the terminal 24 to the dissolve switcher 20 shown in FIGS. 1 and 3 is produced by a ramp signal generator 130 shown in FIG. 24. The dissolve switcher 20 differentially combines the video signals A and B fed thereto through the terminals 12 and 14. This means that the output level of the combined video signal is always constant. The picture appearing when the video signals A and B are combined half and half is called a mix effect, while the fade effect is a kind of dissolve effect, in which one of the video signals to be combined is black. If the non-black video signal is gradually emphasized, this effect is called a fade-in, while if the black signal is emphasized gradually and finally the screen becomes blank, this effect is called a fade-out. Further, the dissolved period is especially called the "duration". This dissolve effect is controlled by the ramp signal applied to the terminal 24.

The ramp signal generator circuit 130 shown in FIG. 24 receives the 30 Hz frame pulse at its input terminal 132. The ramp signal generator circuit 130 includes a phase comparator 134, a voltage controlled oscillator (VCO) 136 and a feedback path 138 which form a PLL (phase locked loop) circuit. The feedback path 138 contains a divide-by-m counter 139 which causes the output of VCO 136 to have a frequency m times as great as the frequency of the signal $f_v$ supplied to phase comparator 134. The frequency of VCO 136 is suitably 256 $f_v$ and is maintained at this frequency by the phase locked loop. Thus, the frequency of VCO 136 is suitably 7.68 KHz. The output frequency of the VCO 136 is applied to a programmable counter 140 having the frequency dividing ratio of 1/n, in which the output frequency of the PLL circuit is frequency-divided by the duration value n to be set. The frequency-divided signal from the counter 140 is fed to a first signal processor 142 which has a fade-in control input terminal 144 and a fade-out control input terminal 146 and also output lines 150 and 152 connected to up and down input terminals of up-down counter 148 respectively. The output signal from the programmable counter 140 is also supplied to the terminal 52 of the speed counter 42 as the speed pulse SP (FIG. 4). The most significant bit (MSB) output of the counter 148 is applied through a line 154 to the first signal processor 142. The outputs of the counter 148 are fed to a D-A converter 156 which converts the digital output from the counter 148 into an analogue ramp signal. The analogue ramp signal from the converter 156 is fed through a second signal processor or ramp signal generator 158 and an amplifier 160 to an output terminal 162. At this output terminal 162 there appears the ramp signal which is applied to the ramp control signal input terminal 24 shown in FIGS. 1 and 3.

By use of the ramp signal generator 130, any desired duration from 0 to 255 frames can be set it is thus possible to set the duration from 0 to 8.5 seconds.

The ramp signal generator 130 shown in FIG. 24 overcomes the above defects effectively. With this generator 130, the signal synchronized with the vertical synchronizing signal in the video signal i.e. the frame pulse signal $f_v$ is converted to a signal with a frequency of 256 $f_v$ by the PLL circuit which consists of the phase comparator 134, the voltage controlled oscillator 136 and the feedback path 138. The frequency 256 $f_v$ is divided in the programmable counter 140 by the desired dissolve duration value n and then the divided frequency signal is counted by the 8-bit counter 148. The time $T_D$ in which the 8-bit counter 148 counts up 256 pulses is expressed as follows:

$$T_D = n/256 f_v \cdot 256 = 1/f_v \cdot n$$

Accordingly, the time $T_D$ is in proportion to the set duration value n. The output from the counter 148 is converted by the D-A converter 156 to the corresponding analogue value, and then amplified by the amplifier 160 having a constant amplification factor. The ramp signal delivered to the output terminal 162 has the gradient corresponding to the desired duration value.

If a relatively long duration is desired by the control of the dissolve and fade, it would be necessary to increase the number of bits of the counter and D-A converter. However, the increase in bit number results in increase of cost. To avoid such a defect, the first signal processor 142 is provided. The processor 142 carries out the ordinary operation as long as the duration n satisfies the condition $1 \leq n \leq 255$, while when $n \leq 256$, the processor 142 operates to produce a ramp signal with the same gradient as that in n=255 and temporarily halts its operation at n=128. Thereafter, it will start the operation thereof in accordance with a re-start command signal.

FIG. 25 is a waveform diagram showing an output ramp signal produced at the output terminal 162 of the ramp signal generator 130 by the above operation. In the graph of FIG. 25, the ordinate represents a voltage level in $V_o$ and the abscissa represents the time in the frame unit. In the graph of FIG. 25, the solid line curve 164 indicates the output ramp signal when the number of bits of the counter and D-A converter are selected to make a gentle gradient of the ramp signal which is substantially straight up to a predetermined value n. Over the value n the output voltage is saturated as indicated at 166. By using the first signal processor circuit 142, the output ramp signal waveform rises with the same gradient as that of n=255 from a start position 168, as indicated in dashed line at 170. At the time n=128, the gradient becomes 0 and hence the output voltage becomes constant, as shown in dashed line at 172. The output ramp signal waveform starts to rise again at a position 174 in response to the re-start command signal and then arrives at the predetermined saturation voltage, as indicated at 166. By this system, the duration of the dissolve is expanded over any desired time range using only an 8-bit counter 140. It is of course possible for the various example values to be changed and also for the frequency of the clock pulse to be selected other than the frame frequency of 30 Hz.

FIG. 26 shows a block diagram of a practical embodiment of the first signal processor 142 shown in FIG. 24. In FIG. 26, the fade-in command signal is fed to a terminal 144 and the fade-out command signal is fed to a terminal 146, respectively. As described later, the fade-out command signal is used for starting the count-down operation of the counter 148 from the saturation level 166 to the zero level 168 in FIG. 25. The frame pulse is applied to a terminal 180, the speed pulse from the programmable counter 140 is applied to a terminal 182, and a reset signal is applied to a terminal 184, respectively. The signal processor 142 includes five D flip-flops 186, 188, 190, 192 and 194 and two AND-gates 196 and 198. THe output from the AND-gate 196 is fed through the lead line 150 to the up-count input terminal of the counter 148, and the output from the AND-gate 198 is fed through the lead line 152 to the down-count input terminal of the counter 148. The 128 count is the most significant bit output from the 8-bit counter 148 and this bit is fed through the line 154 to the clock input terminal of the flip-flop 194. Until reset, the set output Q of flip-flop 194 inhibits the further counting.

The operation of the circuit shown in FIG. 26 explained in connection with FIG. 25. Now assuming that several parameters, such as duration and start time, are stored in a computer (not shown), a fade-in command signal having high level "1" is applied to the input 144 at the time preset by the computer. Therefore, the Q output of flip-flop 186 is produced at when the frame pulse is supplied to the clock terminal CK thereof. Thus the fade-in signal SRT is synchronous with the frame pulse. The Q output signal from the flip-flop 186 is applied to the D-terminal of the flip-flop 190, in which the former signal is in synchronism with the speed pulse supplied to the clock terminal of the flip-flop 190. The synchronizing Q output signal from the flip-flop 190 is further supplied to the AND gate 196, and thereby the gate 196 is opened to supply the speed pulse to the up-terminal of the counter 148.

When the counter 148 finishes counting the 128 speed pulses, the MSB (most significant bit) output 154 of the 8-bit counter 148 becomes 1. The MSB output 154 is supplied to the clock terminal CK of the flip-flop 194, so that the Q-output thereof generates the clear signal 1 because an input signal having high level "1" from the "128" counts to the restart point is supplied to the D-input terminal 200 under control of the computer. A high input signal to terminal 200 from the counter maintains flip-flop 194 in the set condition. The clear signal is supplied to the clear terminal CL of the flip-flop 186, so that the Q-output thereof becomes 0. As a result of the 0 outputs of the flip-flops 186 and 190, the speed pulse SP from the counter 140 is not applied to the counter 148, and hence the output from the D-A converter 156 remains constant, as indicated by the broken line 172 of FIG. 25.

At the restart point 174 a reset signal RST from the computer is supplied through terminal 184 to the clear terminal CL of the flip-flop 194, so that the Q-output thereof becomes 0. Accordingly, the Q-output of the flip-flop 186 again becomes 1 at the time when the subsequent frame pulse $f_v$ is applied to the clock terminal CK of the flip-flop 186. The Q-output of the flip-flop 190 also becomes 1 owing to the Q-output 1 of the flip-flop 186. As a result, the speed pulse is again applied to the up-terminal of the counter 148 and hence the output from the D/A converter 156 goes up linearly. Thus, it is apparent that when the counter 148 counts to its full scale, the output of the D/A converter 156 reaches the saturation level 166. Then, the counter 148 generates a carry output which is used for resetting the start signal SRT. When a duration of less than 255 frames is selected, the computer signals to counter 194 prevents it being triggered into the set condition after 128 counts. Consequently, up-down counter 148 is permitted to count past 128 to saturation.

On the contrary, when it is desired that the output signal obtained from the terminal 162 be dissolved from the saturation level to the zero level, the fade-out command signal is supplied to the input terminal 146 and the circuit comprising the flip-flops 188 and 192 and the AND gate 198 operates in the same manner as the circuit of the flip-flops 186 and 190 and the AND gate 196. However, it is noted that the speed pulse from the AND gate 198 is supplied to the down-terminal of the counter 148. Flip-flop 194 may be an integrated circuit of the SN 7474 type, flip-flops 186 and 188 many each an integrated circuit of the SN 74175 type, and flip-flops 190 and 192 may each be of the SN 74175 type. Other suitable circuits, either integrated or discrete, may be used without departing from the scope of the invention.

The counter 148 shown in FIG. 24 is an octal reversible counter which may be made by connecting two integrated circuits of SN 74193 type in cascade. The output terminal of the counter 148 is connected to the input terminal of the octal D-A converter 156 whose analogue output is processed by the second signal processor 158 and then delivered through the amplifier 160 to the output terminal 162.

Figure 27:
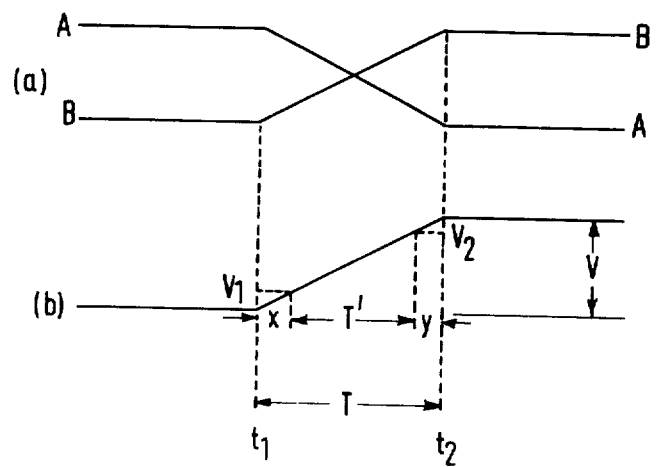
FIGS. 27 and 28 are waveform diagrams used for explaining functions of the ramp signal generator shown in FIG. 24.

If the level of the video signals A and B fed to the dissolve switcher 20 are controlled as shown in FIG. 27a by dissolve switch 20 and if the dissolve switcher 20 is controlled by a ramp signal with the waveform shown in FIG. 27b, the video signals will be switches in a time period T from a time $t_1$ when the dissolve operation starts and to a time $t_2$ when the dissolve operation terminates. Accordingly, in the period T the signals A and B are mixed in a voltage ratio having the gradient of the ramp signal and the levels of the signals A and B are changed gradually from high to low and from low to high, respectively. However, it is noted that the duration period T gives a visual impression to the observer of a shorter dissolve than the actual set time duration T. The reason for this phenomenon is that during a lower portion x of the ramp signal (up to a voltage level $v_1$) and an upper portion y of the ramp signal (up to a voltage level $v_2$) are dead zones in which no change in the signals is sensed by a viewer's eyes. As a result, the time period in which the viewer can perceive the dissolve effect becomes a shorter time period T' as shown in FIG. 27b.

Figure 28:
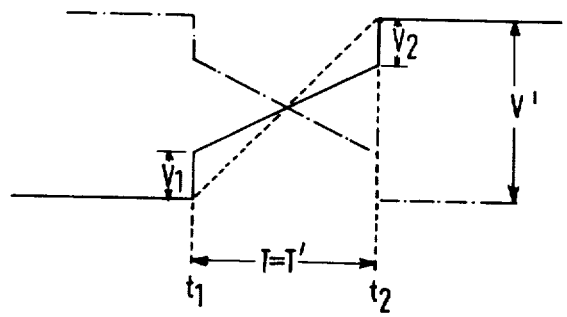

The second signal process 158 is provided to make the set time period T equal to the time period T' in which the viewer recognizes the effect on the screen to improve the property of the dissolve operation. For this purpose the signal processor 158 operates such that the whole amplitude V' of the ramp signal is made $V+V_1+V_2$ as shown in FIG. 28 by a solid line. That is the ramp signal is increased by the voltage level $V_1$ at the start time $t_1$ and by $V_2$ at the time $t_2$ to make the effective time period T' the time period T.

Figure 29:
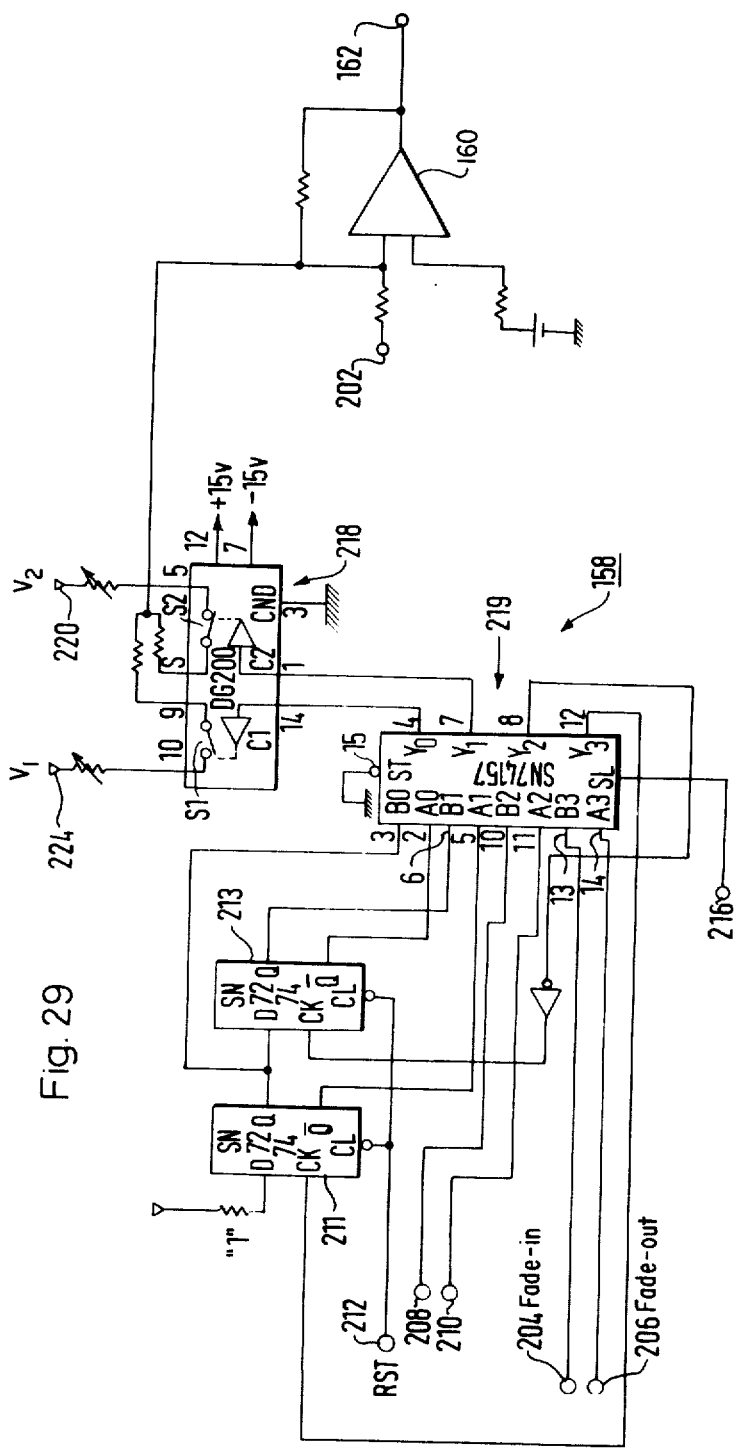
FIG. 29 is a block diagram showing an example of a practical circuit of a second signal processing circuit of FIG. 24 used to achieve the waveforms shown in FIG. 28.

FIG. 29 shows a circuit diagram of the second signal processor 158, in which the output from the D/A converter 156 is added to an input 202 of amplifier 160, the output terminal of which is connected with the output 162.

The processor 158 a first electronic switching device 218 having two switch elements S1 and S2 which are controlled by output Y0 and Y1 from a second switch device 219. The movable arms of the switch elements S1 and S2 are connected through respective resistors with the input of the amplifier 201, while the fixed contacts thereof are connected with D.C. voltage terminals 224 and 220, to which the respective DC voltages corresponding to the voltage levels V1 and V2 are supplied.

The second switching device 219 is the equivalent of four ganged single-pole double throw switches identified at input and output with subscripts 0, 1, 2 and 3. All equivalent switches are controlled by a control signal from terminal 216. Each switch section has a terminal, for example Y0, which corresponds to the moving member of a SPDT switch, and two terminals, for example A0 and B0 which correspond to fixed terminals of the switch. When the control signal is 0, each Y terminal is connected to its A terminal and disconnected from its B terminal. When the control signal is 1, each Y terminal is connected to its B terminal and disconnected from its A terminal. When the control signal is high and the fade-in signal is supplied to a fade-in command signal input terminal 204, the fade-in signal is supplied through the switch terminals B3 and Y3 to clock terminal CK of D-type flip-flop 211. The Q-output of the flip-flop 211 becomes 1 which is then supplied through the switch terminals B0 and Y0 to control terminal C1 of the switch element S1. Accordingly, the switch S1 becomes ON and hence the voltage V1 at the terminal 224 is added to the signal at the input of the amplifier 160. As a result, the output voltage at the output 162 rapidly rises up by the voltage V1. From this condition, the output signal from the D/A converter 156 is gradually applied to the input of the amplifier 160, so that the voltage at the output 162 rises linearly as shown in FIG. 28.

When counter 148 counts to its full scale, that is, the output of the D/A converter reaches the saturation level at the time t2, the counter 148 generates a carry signal and supplies the latter signal to a terminal 208. The carry signal is supplied through the switch terminals B2 and Y2 to clock terminal CK of the flip-flop 213, so that the Q-output of the flip-flop 213 becomes 1 due to high level at the D-terminal thereof. The set signal at the Q-terminal of the flip-flop 213 is applied through the switch switch terminals B1 and Y1 to control terminal C2 of the switch S2. As a result, the switch S2 is turned ON and the V2 voltage at terminal 220 is added to the signal existing at the input of the amplifier 201. The output voltage at the output 162 therefore rapidly rises by the voltage $V_2$ at the time $t_2$, as shown in FIG. 28. The gain of amplifier 160 is such that its output varies by the amount V required to cause the dissolve switcher 20 to completely switch from signal A to signal B, as shown in FIG. 27A, when its input varies by the amount V', which is equal to $V+V_1+V_2$. Thus, the ramp shaded part of the output of amplifier 160 has a lesser slope than the ramp shaped output of D/A converter 156, because the former varies by less than the voltage V during the time T, whereas the latter varies by the full amount of voltage V during that time. The gain of amplifier 160 is fixed at a value which decreases the slope of the ramp signal generated by D/A converter 156, shown in dashed line in FIG. 28, to the solid line shown in that figure.

To accomplish the dissolve operation shown in the dot-dash line of FIG. 28, the control signal from terminal 216 becomes low. Therefore, the Y terminals of switch 29 are connected to respective A terminals. The reset Q̄-outputs of the flip-flops 211 and 213, having high levels prior to time t1, are respectively supplied through the terminals A0 and A1 and Y0 and Y1 to control terminals C1 and C2 of the switches S1 and S2 respectively. As a result, switches S1 and S2 are placed in the ON condition and hence voltages V1 and V2 from the terminals 220 and 224 are both initially supplied to the input of the amplifier 160. At time T1, switch C2 is de-energized. Voltage V2 is removed from the signals summed at the input of amplifier 160.

When the fade-out command signal is applied to terminal 206 at the time t1, the former signal is supplied through the switch terminals A3 and Y3 to the clock terminal CK of the flip-flop 211 and hence the Q̄-output thereof becomes 0. The Q̄ which is supplied through the switch terminals A1 and Y1 to the control terminal C2 of the switch S2. As a result, the switch S2 becomes OFF and hence the voltage V2 is removed from the voltages summed at the input of amplifier 160.00.

Thereafter, the output voltage from the D/A converter linearly decreases until the time t2. When the counter 148 is counted down to 0, it generates a borrow signal which is supplied to terminal 210. The borrow signal defining the time t2, is supplied through the switch terminals A2 and Y2 to the clock terminal CK of the flip-flop 213 and thereby the reset Q̄-output of the flip-flop 213 goes down to the low level 0. The low from the Q̄-output of flip-flop 213 is further supplied through the switch terminals A0 and 40 to the control terminal C1 of the switch S1. Consequently, switch S1 is placed in the OFF condition, so that the voltage from the terminal 224 applied to the input of the amplifier 201 is cut-off. Accordingly, the voltage at the input of amplifier 160 is reduced by the voltage.

Thus as described above, a ramp signal as shown in FIG. 28 is digitally obtained which is controlled.

I claim:

1. A video signal processing circuit for producing a dissolve signal to control dissolving of a video signal by control of the amplitude of said video signal in a gain control circuit which is controlled in response to a control signal, said video signal processing circuit comprising:
   means for generating a clock signal having a frequency which is synchronous with a vertical synchronizing signal of said video signal;
   means for frequency-dividing said clock signal by a preset value n;
   means for counting said frequency-dividing clock signal during at least one vertical period of said video signal;
   means for converting the digital output of said counting means into a corresponding analogue signal, whereby said analogue signal is supplied to said gain control circuit as said gain control signal; and
   first signal processing means connected between said frequency-dividing means and said counting means for preventing the supply of said clock signals during a predetermined interval, when the dissolve duration in said circuit is set at a value in excess of a predetermined period of time.

2. A video signal processing circuit according to claim 1, in which said counting means comprises an up-down counter, the arrangement being such that said clock signal is selectively supplied in a manner to cause up or down counting of said counting means in dependence upon the direction of dissolve.

3. A video signal processing circuit according to claim 2, in which counting means has up and down counting direction control terminals and said first signal processing means comprises first and second gate circuits connected to said up and down terminals of the counting means for supplying said clock signal thereto in response to gate signals applied to the gate circuits.

4. A video signal processing circuit according to claim 3, in which said first signal processing means further comprises a first means for synchronizing said gate signals with at least a vertical synchronizing signal of the video signal.

5. A video signal processing circuit according to claim 4, in which said first signal processing means further comprises a second means connected with said first synchronizing means for synchronizing said gate signals with said clock signal.

6. A video signal processing circuit for producing a dissolve signal to control dissolving of a video signal by control of the amplitude of said video signal in a gain control circuit which is controlled in response to a control signal, said video signal processing circuit comprising: means for generating a clock signal having a frequency which is synchronous with a vertical synchronizing signal of said video signal; means for frequency-dividing said clock signal by a preset value n; means for counting said frequency-divided clock signal during at least one vertical period of said video signal; means for converting the digital output of said counting means into a corresponding analogue signal, whereby said analog signal is supplied to said gain control circuit as said control signal; and signal processing means connected with said means for converting for changing the level of said control signal at initiation and termination of the duration period.

7. A video signal processing circuit for producing a dissolve signal to control dissolving of a video signal by control of the amplitude of said video signal in a gain control circuit which is controlled in response to a control signal, said video signal processing circuit comprising: means for generating a clock signal having a frequency which is synchronous with a vertical synchronizing signal of said video signal; means for frequency-dividing said clock signal by a preset value n; means for counting said frequency-divided clock signal during at least one vertical period of said video signal; means for converting the digital output of said counting means into a corresponding analogue signal, whereby said analogue signal is supplied to said gain control circuit as said control signal; said means for generating a clock signal being a phase locked loop circuit generating an oscillating signal having a frequency Mxfv, where M is an integer and fv is the frame frequency, and said means for frequency- dividing said clock signal being arranged to frequency divide said oscillating signal so as to have the frequency M/n fv, where n is an integer, in accordance with the duration of the dissolve.

8. A circuit for controlling dissolve between at least first and second video signals comprising:
   dissolve switcher means for dissolving between at least first and second video signals in response to a dissolve control signal;
   control signal generating means for generating an analogue ramp signal and including means for varying the duration of said ramp signal according to a selectable digital duration command signal; and
   signal processing means for adjusting said ramp signal to make the perceived duration substantially equal to the ramp duration, the adjusted ramp signal from said signal processing means being applied to said dissolve switcher means as said dissolve control signal.

9. The circuit according to claim 8, wherein said means for varying the duration of said ramp signal includes:
   oscillator means having a first frequency signal;
   programmable counter means effective to generate a second frequency signal related to said first frequency signal by a selectably changeable factor 1/n;
   an up-down counter commandable to selectively increase or decrease the number stored therein in response to said second frequency signal; and
   a digital to analogue converter operative to generate an analogue signal having a voltage proportional to the number stored in said up-down counter.

10. The circuit according to claim 9, wherein said first frequency signal is related to the frame rate of said video signals by a fixed factor M.

11. The circuit according to claim 10, wherein said oscillator means is constituted by a phase locked loop.

12. The circuit according to claim 8, wherein said signal processing means includes first switch means responsive to a start signal for immediately adding or subtracting a first fixed increment of voltage to, or from, respectively, said control signal, and second switch means responsive to a stop signal for immediately adding or subtracting, respectively, a second fixed increment of voltage to, or from, respectively, said control signal; and in which said first and second voltage increments are operative to substantially equalize the perceived dissolve time with the ramp duration.

13. The circuit according to claim 8, further comprising means for inserting a pause in said dissolve control signal when the desired duration exceeds the duration attainable by said means for varying the duration and means for restarting the dissolve control signal in response to a restart signal.

14. A circuit for controlling dissolve between at least first and second video signals comprising:

dissolve switcher means for dissolving between at least first and second video signals in response to a dissolve control signal;

phase locked loop means for generating a first fixed frequency signal related to a synchronizing signal in at least one of said first and second video signals by a fixed factor M;

programmable counter means for dividing said first frequency signal by a selectable factor n and providing a corresponding second frequency signal;

up-down counter means for selectably counting up and down the cycles of said second frequency signal;

a digital to analogue converter operative to generate an analogue signal having a voltage proportional to the digital number in said up-down counter means; and signal processing means operating on said analogue signal for producing therefrom said dissolve control signal which is operative to control said dissolve switcher means such that the perceived dissolve duration of a video display fed by said dissolve switcher means is substantially equal to the duration of said analogue signal.

* * * * *